US012335895B2

(12) United States Patent
Voyer et al.

(10) Patent No.: US 12,335,895 B2
(45) Date of Patent: Jun. 17, 2025

(54) METHOD TO ENABLE A MULTI-IMSI SOLUTION WITHIN 5G NETWORKS

(71) Applicant: THALES DIS FRANCE SAS, Meudon (FR)

(72) Inventors: Jérôme Voyer, La Ciotat (FR); Vincent Dany, Aubagne (FR); Jean-François Gros, Marseilles (FR)

(73) Assignee: THALES DIS FRANCE SAS, Meudon (FR)

( * ) Notice: Subject to any disclaimer, the term of this patent is extended or adjusted under 35 U.S.C. 154(b) by 198 days.

(21) Appl. No.: 17/768,935

(22) PCT Filed: Nov. 3, 2020

(86) PCT No.: PCT/EP2020/080796
§ 371 (c)(1),
(2) Date: Apr. 14, 2022

(87) PCT Pub. No.: WO2021/089533
PCT Pub. Date: May 14, 2021

(65) Prior Publication Data
US 2024/0107483 A1    Mar. 28, 2024

(30) Foreign Application Priority Data
Nov. 5, 2019  (EP) .................................. 19306430

(51) Int. Cl.
*H04W 60/04*     (2009.01)
*H04W 12/0431*   (2021.01)
*H04W 12/06*     (2021.01)

(52) U.S. Cl.
CPC ....... *H04W 60/04* (2013.01); *H04W 12/0431* (2021.01); *H04W 12/06* (2013.01)

(58) Field of Classification Search
CPC .. H04W 12/06; H04W 60/04; H04W 12/0431
See application file for complete search history.

(56) References Cited

U.S. PATENT DOCUMENTS

2015/0319603 A1* 11/2015 Faller .................... H04W 8/00
                                                     455/432.1
2019/0268335 A1*  8/2019 Targali .................. H04W 12/72
(Continued)

OTHER PUBLICATIONS

International Search Report (PCT/ISA/210) and Written Opinion (PCT/ISA/237) mailed on Dec. 21, 2020, by the European Patent Office as the International Searching Authority for current International Application No. PCT/EP2020/079197—[16 pages].

(Continued)

*Primary Examiner* — Jackie Zuniga Abad

(57) ABSTRACT

Provided is a method for attaching a terminal cooperating with a secure element to the network of a MNO of a visited country. The method includes steps of switching a set of files of said secure element to a new value, including a new SUPI, called entity support SUPI; Building at the level of said secure element an entity support SUCI; Routing an attachment request to said support entity with said entity support SUCI; Decrypting in said support entity said entity support SUCI back in said entity support SUPI; and Swapping said support entity SUPI to the SUPI corresponding to the MNO of the home country. If an authentication is performed that is positive, an attachment acknowledgement message is sent to connect said terminal to said network of said MNO of said visited country.

5 Claims, 3 Drawing Sheets

(56) References Cited

U.S. PATENT DOCUMENTS

2022/0240213 A1* 7/2022 Ly .................. H04W 48/18
2022/0408243 A1* 12/2022 Mattsson ............ H04W 12/40

OTHER PUBLICATIONS

"3 Generation Partnership Project, Technical Specification Group Services and System Aspects; Security architecture and procedures for 5G system (Release 16)", 3GPP Standard; Technical Specification; 3GPP TS 33.501, 3rd Generation Partnership Project (3GPP), Mobile Competence Centre; 650, Route Des Lucioles ; F-06921 Sophia-Antipolis Cedex; France—vol. SA WG3, No. VI6.0.0—Sep. 25, 2019 (Sep. 25, 2019), pp. 1-196, XP051784886, URL:ftp://ftp.3gpp.org/Specs/archive/33_series/33.501/33501- g00.zip 33501-g00.doc.

ORANGE: "Discussion on use case needing UDM selection based on individual SUP!", 3GPP Draft; C4-185240, 3rd Generation Partnership Project (3GPP), Mobile Competence Centre; 650, Route Des Lucioles ; F-06921 Sophia-Antipolis Cedex ; France—vol. CT WG4, No. Sophia-Antipolis, FR; Jul. 9, 2018-Jul. 13, 2019—Jun. 29, 2018 (Jun. 29, 2018), XP051472349, Retrieved from the Internet: URL:http:/www.3gpp.org/ftp/tsg%5Fct/WG4%5Fprotocollars%5Fex%2DCN4/TSGCT4%5F85bis%5FSophia%5FAntipolis/Docs.

Apple Inc. "Correction of SUCI Context in section 7.5.1.1", 3GPP Draft; C6-190333, 3rd Generationpartnership Project (3GPP), Mobile Competence Centre; 650, Route Des Lucioles ; F-06921 Sophia-Antipolis Cedex ; France—vol. CT WG6, No. Portoroz, Slovenia; Oct. 8, 2019-Oct. 11, 2019 Sep. 30, 2019 (Sep. 30, 2019), XP051800841, Retrieved from the Internet: URL:https://ftp.3gpp.org/Meetings 3GPP SYN C/CT6/Docs/C6-190333.zip C6-190333.docx.

* cited by examiner

METHOD TO ENABLE A MULTI-IMSI SOLUTION WITHIN 5G NETWORKS

TECHNICAL FIELD

The present invention concerns telecommunications and more precisely roaming in 5G networks, and more specifically connection and authentication of secure elements in a terminal on a 5G network.

BACKGROUND

A terminal (a mobile terminal like a smartphone, a PDA or a computer for example or a M2M equipment) cooperating with a secure element (a SIM card, a UICC, an eUICC (embedded UICC) or an iUICC (integrated UICC) for example) can roam in different countries. The secure element can also be in the form of an embedded software comprised in the terminal. The terminal is normally attached to his home network but when it enters in another country, roaming agreements are in place between the home network operator and operators of the visited country. This permits to the terminal to handle calls, e-mails, SMS, . . . in the visited country.

A secure element having stored therein a plurality of IMSIs (International Mobile Subscription Identifiers) can be used with terminals. A multi IMSI solution enables a MNO having limited roaming agreements to leverage other MNOs roaming agreements (so called "sponsors"). When the device/user is roaming, a multi-IMS applet in the SIM changes the IMSI to the sponsor IMSI. An IMSI in constituted by a code MCC/MNC/MSIN, where MCC is a Mobile Country Code, MNC is a Mobile Network Code and MSIN is the Mobile Subscriber Identification Number of the subscriber of the MNO.

FIG. 1 represents this state of the art. In this figure, a user 100 is in a visited country A 500 different from his home country 503. At step 101, the user 100 turns on his mobile phone (terminal) in the visited country A 500 or is automatically connected to the PLMN of the visited country. Then, at step 102, a multi-IMSI applet present in the secure element cooperating with his mobile phone (a Sim card, a UICC, an eUICC, an iUICC or a soft SIM) detects, thanks to the received signals from the best received signals of the PLMN comprised in the list of the of the PLMNs included in a list of the MNOs with which his home MNO have agreed roaming agreements. It is foreseen that the mobile phone receives signals from the so called sponsor MNO 501. This is done thanks to the MCC/MNC codes received from the neighboring base stations (BTS) of the sponsor MNO 501. On this basis, the applet selects a corresponding IMSI, called sponsor IMSI. For example, if the user 100 is in country A 500, the IMSI selected is IMSI of sponsor MNO 1 (501), if the user 100 is in country B, the IMSI selected is IMSI of sponsor MNO 2 and so on. By default, the IMSI used by the secure element is that of the home country 503.

The multi-IMSI applet then sends (step 103) an attachment request to the BSS of the network of the visited country having roaming agreements with the sponsor MNO 501 (here sponsor 1 since the user is in country A). The attachment request comprises the IMSI of sponsor MNO 1 (501). The network of sponsor MNO 1 501 knows that it has allocated this IMSI to the roaming hub and redirects the attachment request to a roaming hub 502. The roaming hub comprises a table associating the IMSI of sponsor MNO 1 501 to the IMSI of the MNO 503 of the home country of the subscriber.

A range of IMSIs is allocated to the roaming hub 502 by the sponsor MNO 501 in order that it can recognize the IMSI used by the secure element when it is in his home country 503 (and the roaming hub 502 thus knows to which MNO he must forward the attachment request).

So, the IMSI codes are known by the roaming hub 502 since they are in a range of codes allocated by the sponsor MNO 501. The roaming hub 502 switches the sponsor 1 IMSI to the IMSI of the home country 503 of the subscriber.

At step 105, the home country HLR (Home Location Register) performs an authentication of the secure element and authorizes the secure element to connect to the network in the visited country (having roaming agreement with the sponsor MNO of country A 500 (step 106)) through a message sent to the secure element through the roaming hub 502 and the network of sponsor 1 MNO 501.

The network of the home country 503 is able to update the IMSI list of the secure element through an OTA platform (Over The Air platform) (step 107), for example for adding a new sponsor. This solution works with 3G/4G networks.

The problem is that it does not work with 5G networks since the IMSI (called SUPI) is encrypted and it is not possible for the sponsor MNO 501 and the roaming hub 502 to route the secure element attachment request to the home MNO 503. It is not possible for them to route the attachment request because the SUPI is encrypted in a SUCI with a home MNO key and they require the full SUPI value to route the attachment request to the home MNO 503.

In brief, in 5G the multi-IMSI solution does not work anymore.

SUMMARY

The present invention proposes a solution to this problem. The invention proposes a method for attaching a terminal cooperating with a secure element to the network of a MNO of a visited country when detecting the terminal being in the visited country, the method comprising:

Switching a set of files of the secure element to a new value, including a new SUPI, called entity support SUPI, corresponding to a support entity, the new value corresponding to a SUPI recognized by the support entity;

Building at the level of the secure element an entity support SUCI, with a corresponding public key, called entity support public key, and a routing ID, called entity support routing ID;

Routing an attachment request to the support entity with the entity support SUCI;

Decrypting in the support entity the entity support SUCI back in the entity support SUPI;

Swapping at the level of the support entity the support entity SUPI to the SUPI corresponding to the MNO of the home country of the terminal;

Sending the attachment request from the support entity to the network of the MNO of the home country;

Performing an authentication of the secure element at the level of the MNO of the home country thanks to the SUPI;

If the authentication is positive at the level of the MNO of the home country, sending from the MNO of the home country to the MNO of the visited country an attachment acknowledgement message in order to connect the terminal to the network of the MNO of the visited country.

In one embodiment, the support entity is a sponsor MNO having the private key for de-cyphering the SUCI, the sponsor MNO sending the SUPI to a roaming hub, the roaming hub making the swap from entity support SUPI to home SUPI and sending the home SUPI to the MNO of the home country.

In this case, the support routing ID is preferably the one of the sponsor MNO.

In another embodiment, the support entity is a roaming hub having the private key for de-cyphering the SUCI, the roaming hub receiving the SUCI from a sponsor MNO receiving the SUCI from a sponsor MNO to which the SUCI has been sent by the terminal, the roaming hub swapping from entity support SUPI to home SUPI and sending the home SUPI to the MNO of the home country.

In this case, the support routing ID is the one for the sponsor MNO to route the attachment request to the roaming hub. The secure element is preferably among of: a SIM card, an UICC, an eUICC, an iUICC, and a software embedded in the terminal.

The invention also concerns a secure element cooperating with a terminal, the secure element comprising instructions for implementing the following steps:
  switching a set of files to a new value, including a new SUPI, called entity support SUPI, corresponding to a support entity, the new value corresponding to a SUPI recognized by the support entity;
  building an entity support SUCI, with a corresponding public key, called entity support public key, and a routing ID, called entity support routing ID;
  sending an attachment request to this support entity with the entity support SUCI;
  connecting the terminal to the network of the MNO of the visited country if the MNO of his home country has authenticated it.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. Where.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Figure 1:
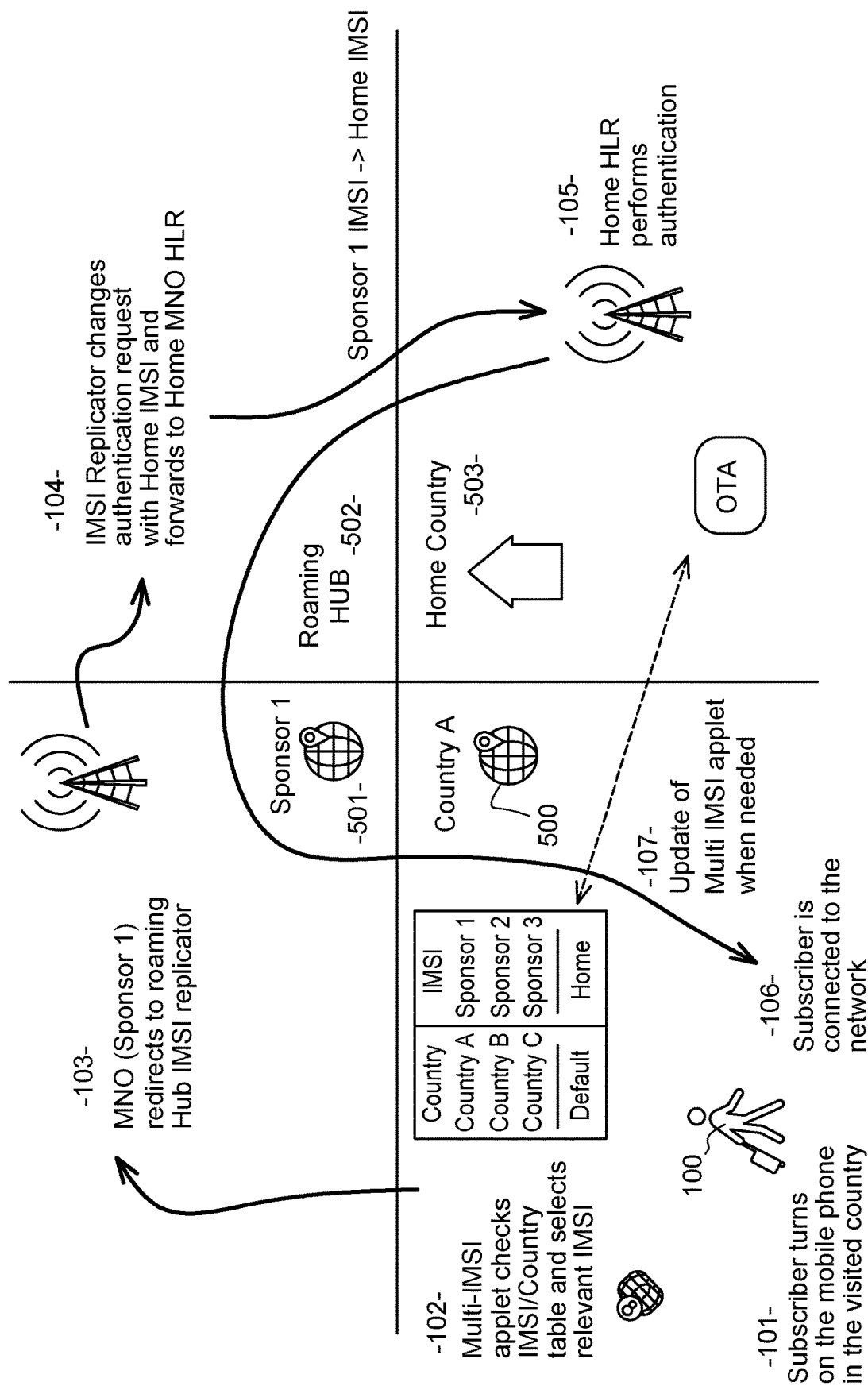
FIG. 1 represents the state of the art for 3G/4G networks.
Figure 2:
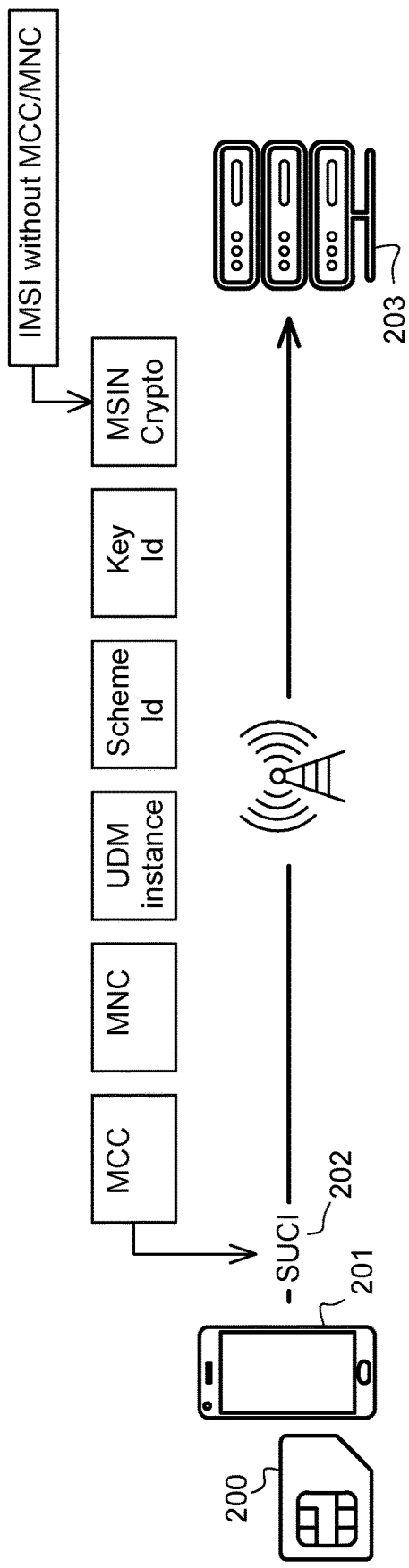
FIG. 2 illustrates encryption of an IMSI, called SUPI in a 5G environment, the SUPI encrypted being called a SUCI.

In FIG. 2, there is represented a secure element 200 cooperating with a terminal 201. The terminal 201 sends a SUCI 202 (it means an encrypted SUPI, SUPI being the equivalent of an IMSI in a 5G network) to the sponsor MNO 203 when being abroad (no more coverage of the home MNO).

The SUCI 202 comprises:
  The MCC code of the sponsor MNO;
  The MNC code of the sponsor MNO;
  A UDM instance that corresponds to a Routing ID (in order to contact a given UDM of the sponsor MNO or the roaming hub);
  A scheme ID that is an algorithm to encrypt the sent data. This scheme ID is put to zero (no algorithm);
  A key identifier (Key Id) that is an identifier of a key. This identifier is also put to zero;
  An encrypted MSIN of the secure element, this MSIN corresponding to a MSIN affected to the secure element in the roaming country, without the MCC and MNC codes (only the MSIN is encrypted). The encryption is preferably done by ECC (elliptic curve cryptography) for privacy reasons.

The MCC, MNC, UDM instance (RID), Scheme ID and Key ID are sent in clear to the sponsor MNO 501. The MSIN corresponding to the one corresponding to the visited country 500 is encrypted and sent along with. The MSIN is the one corresponding to the sponsor MNO 501 (country A->MSIN of sponsor MNO of country A).

Figure 3:
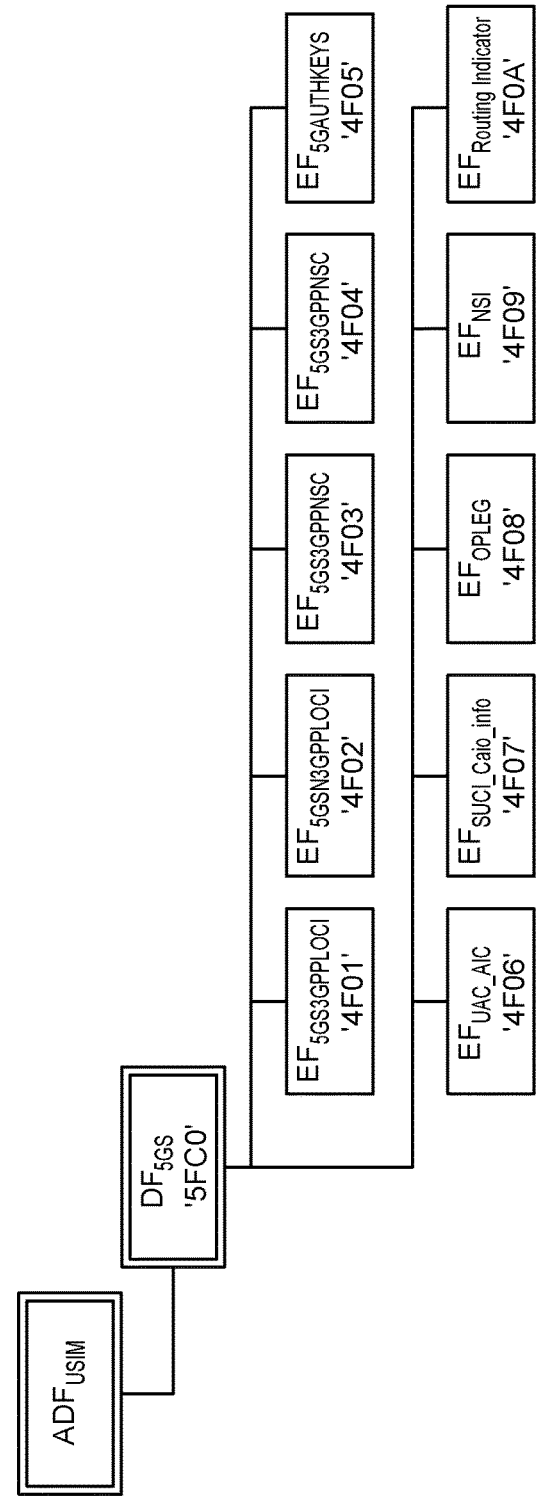
FIG. 3 files in the secure element allowing to implement the present invention.

FIG. 3 represents files in the secure element allowing to implement the invention. These files are standard files according to ETSI TS 131 102 V15.5.0 (2019-04).

A first file EFsuci_calc_info '4F07' comprises for each sponsor MNO or the roaming hub a public key (the sponsor MNO has the corresponding private key). As it will be explained later, it is also possible to use a public key for which the roaming hub has a corresponding private key.

A second file EFrouting_indicator '40A' identifies to which a UDM of the sponsor MNO the SUCI has to be sent (the attachment request goes to a BTS of the sponsor MNO and is forwarded to an AMF (Visitor Location Register) linked to a plurality of UDMs). The AMF looks up the first digits of the MSIN in order to route the request to a given HLR. It is also possible to select a RID of the roaming hub.

The invention proposes to store in these files the public keys and the routing IDs. It is also possible to store these information in a buffer of the secure element or of the terminal.

Figure 4:
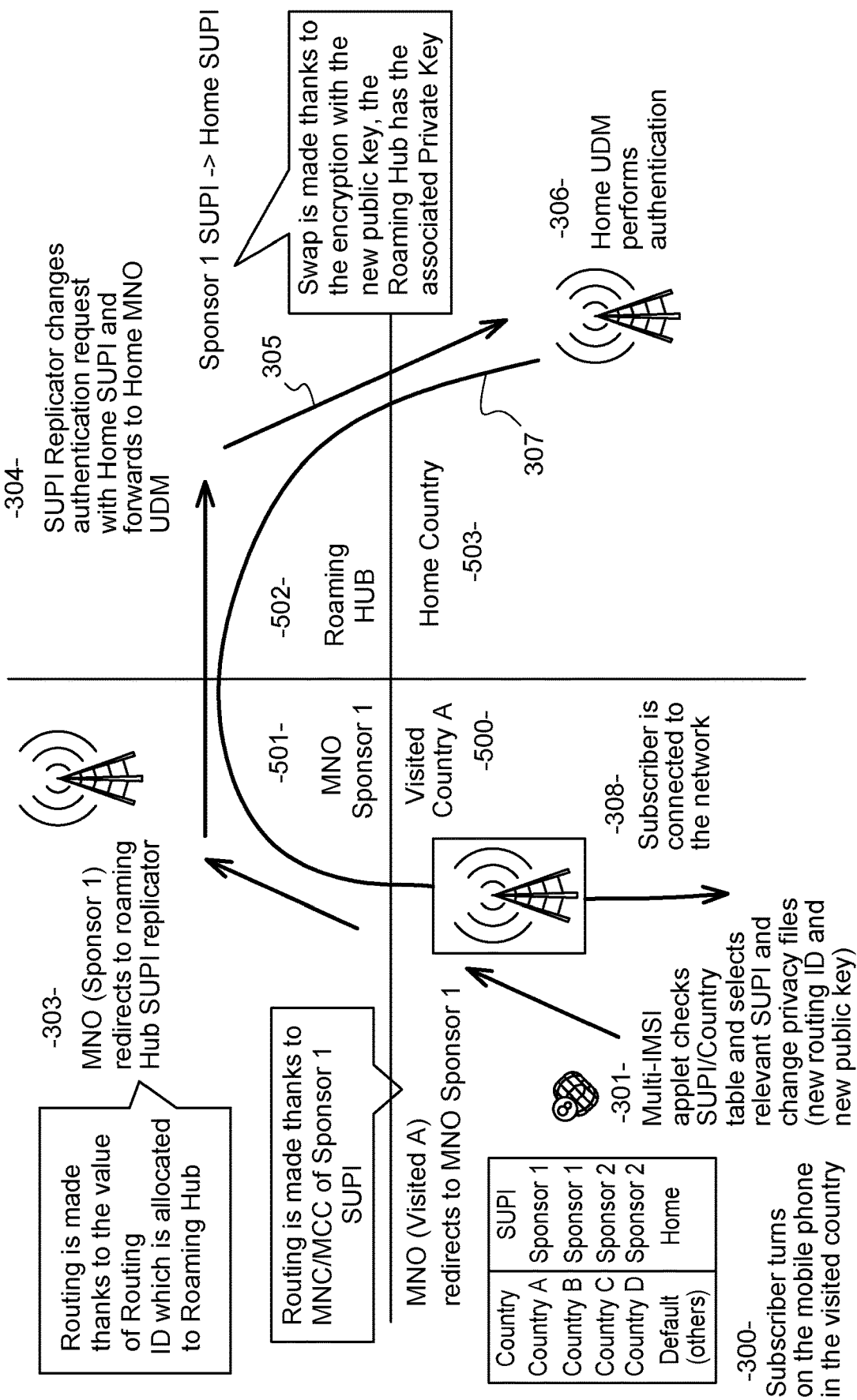
FIG. 4 the a method according to an embodiment of the invention.

According to the invention, described in FIG. 4, when the secure element detects that it is in roaming, for example after that the subscriber has turned on his mobile phone in the visited country 500 (step 300), the multi-IMSI applet switches its IMSI (2G, 3G or 4G) or SUPI (5G) to a SUPI of the sponsor MNO 501 (step 301) and selects a corresponding public key (all secure elements in roaming in a given country select the same public key). The SUPI is encrypted according to FIG. 2 in a SUCI. The first part of the SUCI is unencrypted, only the MSIN of the secure element for the sponsor MNO 501 is encrypted with the public key.

In this figure, the routing ID (RID) chosen by the secure element is a routing ID of the roaming hub 502 but as it will be seen later on, the RID can be a RID of the sponsor MNO 501 or the RID of the roaming hub 502. So, generally speaking, the sponsor MNO 501 and the roaming hub 502 constitute so called "support entities" and the secure element, when detecting being abroad, switches a set of files to a new value, including a new SUPI, called entity support SUPI, corresponding to a support entity (the SUPI of the sponsor MNO) and builds an entity support SUCI, with a corresponding public key, called entity support public key, and a routing ID, called entity support routing ID. The support private key able to decrypt the attachment request is at the level of the support entity (the UDM of the sponsor MNO 501 or the roaming hub 502).

The secure element sends the attachment request to the support entity through the MNO network of the visited country A 500 with the entity support SUCI. The support entity decrypts the entity support SUCI back in the entity support SUPI thanks to its private key.

The secure element then sends this SUCI to the 5G network of the sponsor MNO 501. As already said, two alternatives are possible:

The first alternative is when the public key used for encrypting the MSIN is a public key of the sponsor MNO 501. A UDM of the sponsor MNO 501 (identified by a sponsor RID) receives the SUCI and uses his private key in order to decrypt the MSIN of the secure element. The UDM can then forward the SUPI to the roaming hub 502 that switches the received SUPI having the sponsor MNO's MCC/MNC to the MCC/MNC of the MNO of the home country 503.

The second alternative is when the public key used for encrypting the MSIN is a public key of the roaming hub 502 as shown in FIG. 4. The roaming hub 502 (identified by a roaming hub RID) receives the SUCI when the public key used for encrypting the MSIN is a public key of the roaming hub 502. The roaming hub 502 uses his private key in order to decrypt the MSIN of the secure element affected in the visited country. The sponsor MNO UDM, when receiving an attachment request from the secure element comprising a MSIN encrypted by a roaming hub public key, cannot decrypt the SUCI and forwards it directly to the roaming hub 502 (step 303). The roaming hub 502 switches the reconstructed SUPI to the SUPI of the MNO of the home country.

In summary, when the sponsor MNO decrypts the SUCI, the SUCI is encrypted with a PKsponsor key (PK meaning "Public Key") and comprises a RIDsponsor. When the roaming hub 502 decrypts the SUCI, the SUCI is encrypted with a PKhub key and comprises a RIDhub. So, each of these entities is capable of decrypting the received SUCI. So, generally speaking, the SUPI can be called an entity support SUPI, the entity being the sponsor MNO or the roaming hub 502.

The support entity (here the roaming hub 502) then swaps (step 304) the support entity SUPI to the SUPI corresponding to the MNO of the home country of the terminal. Again, this can be done at the level of the sponsor MNO or at the level of the roaming hub 502.

The roaming hub 502 then sends the attachment request to the UDM of the network of the MNO of the home country 503 (step 305).

The home network of the home country 503 then performs an authentication (step 306) of the secure element thanks to the SUPI and, if the authentication is positive, the MNO of the home country 503 sends to the MNO of the visited country 500 an attachment acknowledgement message (step 307) in order to connect the terminal to the network of the MNO of the visited country 500 (step 308). This is done through the roaming hub 502 and the sponsor MNO 501.

So, the support entity can be a sponsor MNO 501 having the private key for de-cyphering the SUCI, this sponsor MNO 501 sending the SUPI to a roaming hub 502, the roaming hub 502 making the swap from entity support SUPI to home SUPI and sending the home SUPI to the MNO of the home country 503.

In this case, the support routing ID is the one of the sponsor MNO 501.

In another case, the support entity is a roaming hub 502 having the private key for de-cyphering the SUCI, the roaming hub 502 receiving the SUCI from a sponsor MNO 501 to which the SUCI has been sent by the terminal, the roaming hub 502 swapping from entity support SUPI to home SUPI and sending the home SUPI to the MNO of the home country 503.

In this case, the support routing ID is the one for the sponsor MNO 501 to route the attachment request to the roaming hub 502. Again, the RID used by the secure element is the RID of the sponsor MNO 501 when the sponsor MNO 501 deciphers the SUCI.

It can also be a special RID (decided by the sponsor MNO 501) indicating to the sponsor MNO 501 that the received SUCI is to be sent to the roaming hub 502 when the roaming hub 502 deciphers the SUCI, like described in FIG. 4.

The method applies to all kinds of secure elements. The secure element can be a SIM card, an UICC, an eUICC, an iUICC or a software embedded in the terminal.

The invention also concerns a secure element comprising instructions for implementing the steps of FIG. 4, wherein, it:

switches a set of files to a new value, including a new SUPI, called entity support SUPI, corresponding to a support entity (501 or 502), said new value corresponding to a SUPI recognized by said support entity (501 or 502);

Builds an entity support SUCI, with a corresponding public key, called entity support public key, and a routing ID, called entity support routing ID;

Sends an attachment request to this support entity (501 or 502) with the entity support SUCI;

Connects the terminal to the network of the MNO of the visited country 500 if the MNO of his home country 503 has authenticated it.

The invention permits to enable multi-IMSI secure elements to work in 5G and leverages privacy features.

The invention claimed is:

1. A method for attaching a terminal cooperating with a secure element to the network of a MNO, Mobile Network Operator, of a visited country when detecting said terminal being in said visited country, said method comprising:

Replacing a set of files of said secure element by a new value, including a new SUPI, Subscription Permanent Identifier, called entity support SUPI, corresponding to a support entity, said new value corresponding to a SUPI recognized by said support entity;

Building at the level of said secure element an entity support SUCI, Subscription Concealed Identifier, with a corresponding public key, called entity support public key, and a routing ID, Identifier, called entity support routing ID, routing identifier;

Routing by said terminal an attachment request to said support entity with said entity support SUCI;

said support entity being one of:

a sponsor MNO having an entity support private key for de-cyphering said entity support SUCI into said entity support SUPI, said sponsor MNO sending said entity support SUPI to a roaming hub, a roaming hub having an entity support private key for de-cyphering said entity support SUCI into said entity support SUPI, said roaming hub receiving said entity support SUCI from a sponsor MNO to which said entity support SUCI has been sent by said terminal;

Replacing at said roaming hub said entity support SUPI by a home SUPI and sending said home SUPI to the MNO of the home country of said terminal in an attachment request message;

Performing an authentication of said secure element by the network of said MNO of said home country based on said home SUPI; and If said authentication is positive, sending from said MNO of said home country to the MNO of said visited country an attachment acknowledgement message in order to connect said terminal to said network of said MNO of said visited country.

2. The method according to claim 1, wherein when said support entity is a sponsor MNO, said support routing ID is the one of said sponsor MNO.

3. The method according to claim 1, wherein said support entity is a roaming hub and said support routing ID is the one for the sponsor MNO to route the attachment request to said roaming hub.

4. The method according to claim 1, wherein said secure element is one among a SIM card, an UICC, an eUICC, an iUICC, and a software embedded in said terminal.

5. A secure element cooperating with a terminal, said secure element comprising instructions for implementing the following steps:

switching a set of files to a new value, including a new SUPI, Subscription Permanent Identifier, called entity support SUPI, corresponding to a support entity, said new value corresponding to a SUPI recognized by said support entity;

building an entity support SUCI, Subscription Concealed Identifier, with a corresponding public key, called entity support public key, and a routing ID, called entity support routing ID;

sending an attachment request to this support entity with the entity support SUCI;

connecting said terminal to the network of the MNO of the visited country if the MNO, Mobile Network Operator, of his home country has authenticated it, said support entity being one of:

a sponsor MNO having an entity support private key for de-cyphering said entity support SUCI into an entity support SUPI, said sponsor MNO sending said entity support SUPI to a roaming hub, a roaming hub having an entity support private key for de-cyphering said entity support SUCI into an entity support SUPI, said roaming hub receiving said entity support SUCI from a sponsor MNO to which said entity support SUCI has been sent by said terminal.

* * * * *